United States Patent [19]
Sugg

[11] Patent Number: 5,395,524
[45] Date of Patent: Mar. 7, 1995

[54] APPARATUS FOR FILTERING A FLUID IN A FLUID SUPPLY CONDUIT

[75] Inventor: William R. Sugg, La Crescent, Minn.

[73] Assignee: Multistack, Inc., West Salem, Wis.

[21] Appl. No.: 989,032

[22] Filed: Dec. 10, 1992

[51] Int. Cl.[6] .......................... C02F 9/00; B01D 29/54
[52] U.S. Cl. .................................... 210/256; 210/238; 210/450; 210/470; 210/499; 210/342; 62/474; 62/475
[58] Field of Search ...................... 210/806, 323.1, 256, 210/266, 437, 456, 181, 175, 323.2, 450, 342, 315, 487, 497.01, 499, 470, 238; 62/474, 475, 85

[56] References Cited

U.S. PATENT DOCUMENTS

| | | | |
|---|---|---|---|
| 1,339,045 | 5/1920 | Stern | 210/339 |
| 1,810,965 | 6/1931 | Hopkins | 210/323.1 |
| 2,792,118 | 5/1957 | Kraissl, Jr. | 210/315 |
| 3,081,878 | 3/1963 | McCarty . | |
| 3,700,110 | 10/1972 | Engalitcheff, Jr. | 210/450 |
| 3,870,636 | 3/1975 | Schettler | 210/236 |
| 4,111,814 | 9/1978 | Knigge | 210/323.1 |
| 4,171,209 | 10/1979 | Brown | 210/451 |
| 4,559,138 | 12/1985 | Harms, II | 210/450 |
| 4,581,903 | 4/1986 | Kerry | 62/474 |
| 4,715,954 | 12/1987 | DeGraffenreid | 210/323.1 |
| 4,745,772 | 5/1988 | Ferris | 62/474 |
| 4,887,435 | 12/1989 | Anderson, Jr. | 62/475 |
| 5,005,369 | 4/1991 | Manz | 62/85 |
| 5,018,361 | 5/1991 | Kroll et al. | 62/85 |
| 5,127,239 | 7/1992 | Manz et al. | 62/475 |
| 5,151,181 | 9/1992 | Barry | 210/487 |
| 5,189,889 | 3/1993 | Daily | 62/475 |

*Primary Examiner*—Robert A. Dawson
*Assistant Examiner*—Ana M. Fortuna
*Attorney, Agent, or Firm*—Dvorak and Traub

[57] ABSTRACT

A filter for a refrigeration unit having a heat exchange fluid supply conduit. The filter is a substantially cylindrical filter screen having a radial flange disposed at each end. One or more filters are disposed along the entire length of the fluid supply conduit to maximize the surface area of the filter screen. Each radial flange has a gasket disposed thereon for providing a seal that prevents the fluid from circumventing the filter screen of the one or more filters. As fluid passes through the conduit, it flows radially through the filter along the entire length of the conduit thereby reducing the adverse effect on fluid pressure in the conduit and passes through the screen, into a volume defined exterior to the filter, thereby minimizing the pressure drop experienced along the fluid supply conduit.

9 Claims, 2 Drawing Sheets

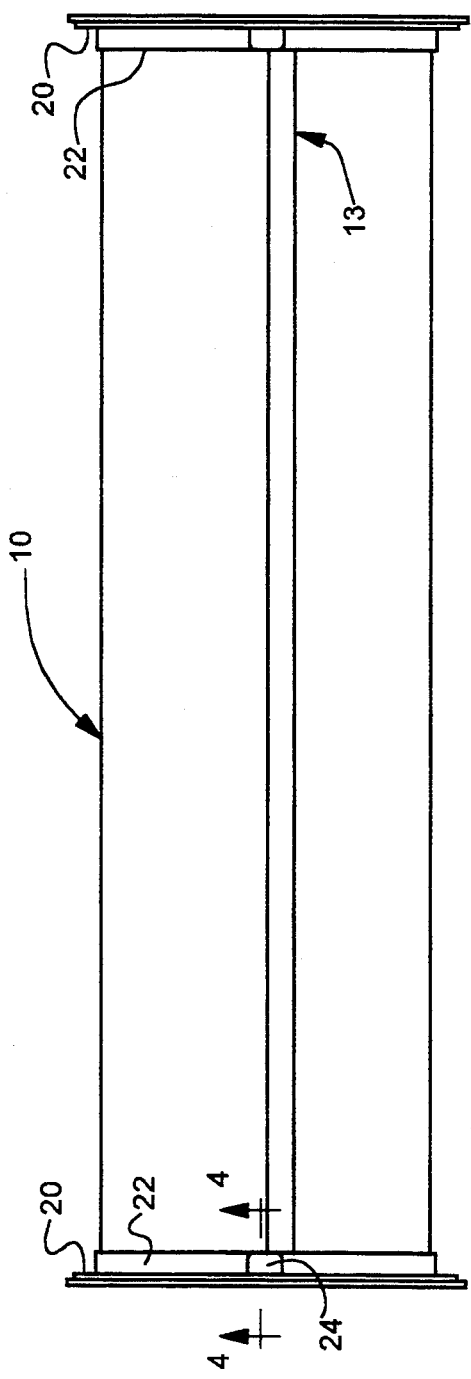
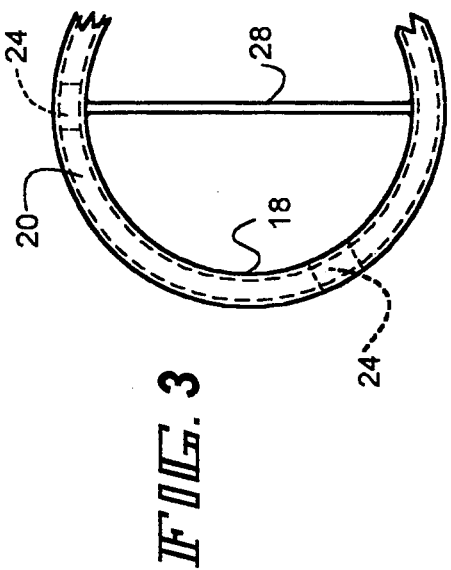
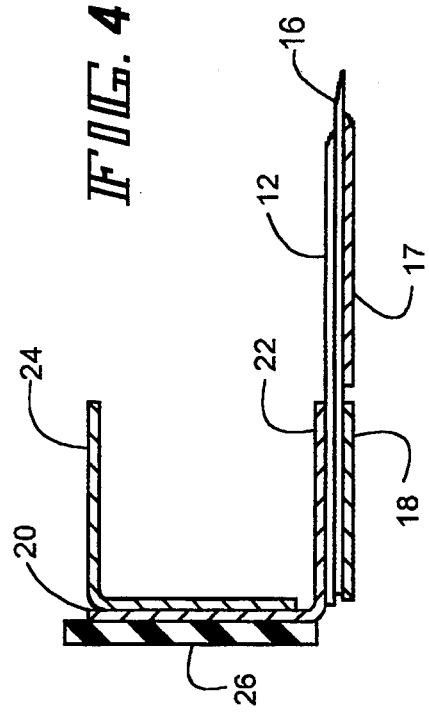
FIG. 2
FIG. 3
FIG. 4

APPARATUS FOR FILTERING A FLUID IN A FLUID SUPPLY CONDUIT

BACKGROUND OF THE INVENTION

The present invention relates to a filter cartridge for use in a fluid supply conduit and more specifically to a filter that may be used in a heat exchange fluid supply conduit of a modular refrigeration system.

Fluid filtration systems often comprise a separate filtration sub-system interposed along a fluid supply conduit of a primary system. Filtration sub-systems, however, have an adverse effect on fluid pressure by causing a substantial decrease in fluid pressure (pressure drop) in the conduit at the location of the filtration sub-system. Filtration sub-systems also have a disadvantage in that they may require modification of the primary system in order to interconnect the filtration sub-system. Filtration sub-systems have a further disadvantage in that they are expensive to manufacture and maintain. There is therefore a need for an advancement in the art of fluid filtration in a fluid supply conduit.

It is an object of the present invention to provide a novel filter.

It is also an object of the present invention to provide a novel filter for use in a fluid supply conduit that reduces the pressure drop in the conduit.

It is a further object of the present invention to provide a novel filter for a fluid supply conduit that does not require modification of the fluid supply conduit.

The present invention is a filter for a refrigeration unit having a heat exchange fluid supply conduit. The filter is a substantially cylindrical filter screen having a radial flange extending from each end. One or more filters are disposed along the entire length of the fluid supply conduit to maximize the surface area of the filter screen. Each radial flange has a gasket disposed thereon for providing a seal that prevents the fluid from circumventing the filter screen of the one or more filters. As fluid passes through the conduit, it flows radially through the filter along the entire length of the conduit.

These and other objects, features, and advantages of the present invention will become apparent from the following description when read in connection with the accompanying drawings.

BRIEF DESCRIPTION OF THE DRAWINGS

FIG. 2 is a side view of the novel filter.

FIG. 3 is a partial end view of the novel filter.

FIG. 4 is a partial view of the novel filter taken along the lines 4—4 of FIG. 2.

DETAILED DESCRIPTION OF THE EMBODIMENTS OF THE INVENTION

Figure 1:
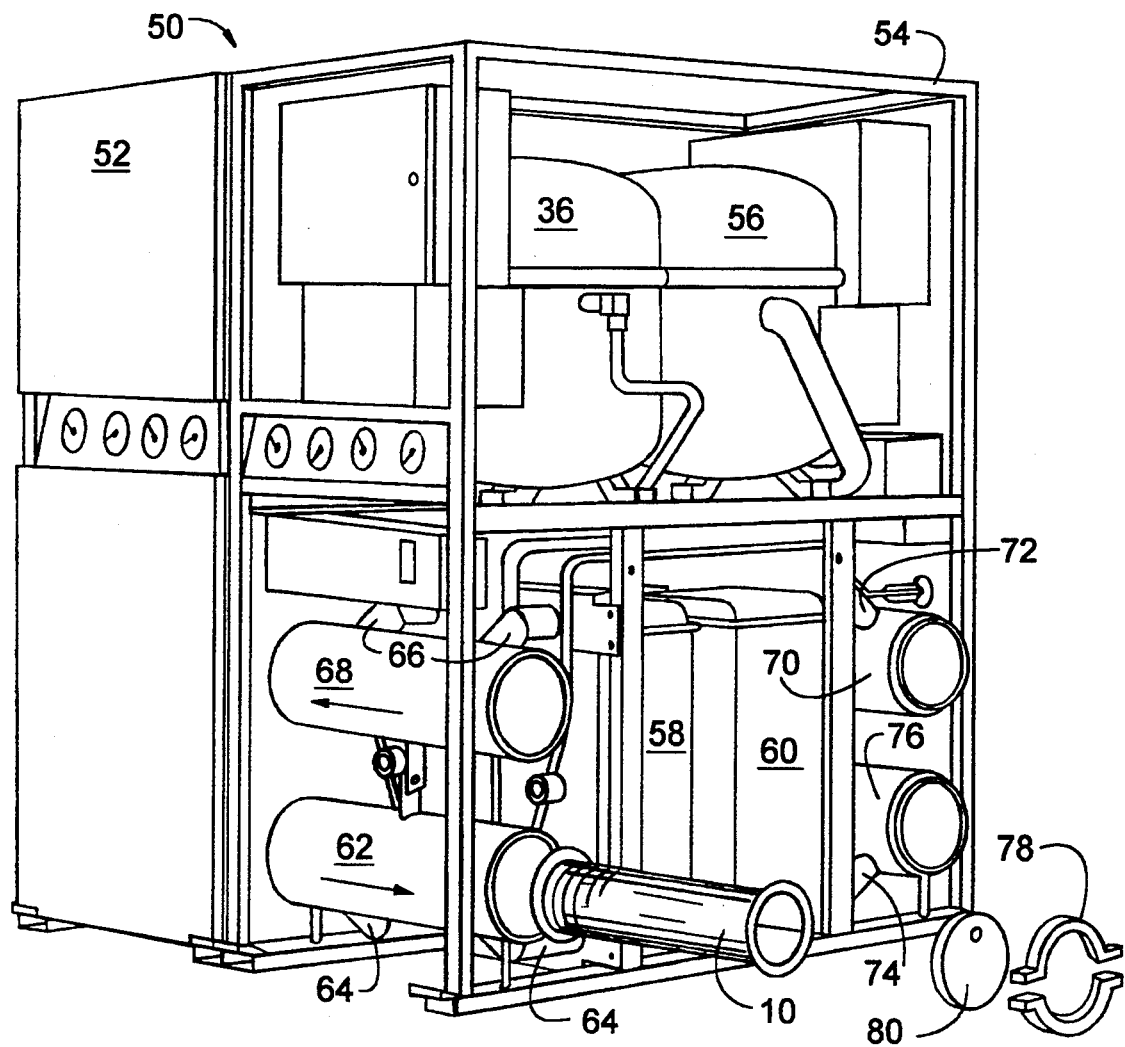
FIG. 1 is a perspective view of a novel filter and a modular refrigeration system comprised of two refrigeration units.

FIG. 1 is a perspective view of a novel filter 10 for filtering a heat exchange fluid of a modular refrigeration system 50 comprised of one or more refrigeration units 52, for example, the MULTISTACK TM MS-30 and MS-50 Water Chillers. The filter may, however, be used to filter a fluid flowing through any conduit as discussed below.

FIGS. 2, 3, and 4 show the filter 10 generally comprising a first outer shell or cylindrical filter screen 12 manufactured from a material suitable for use in an environment of a heat exchange fluid. In the exemplary embodiment disclosed, a 22 guage, No. 304 stainless steel sheet having a 50% perforation area is rolled and attached along a seam 13 to form a 5 inch diameter cylinder that is approximately 22 inches long. A second inner shell or cylindrical filter screen 16 may be concentrically disposed within the first filter screen 12. The filter screen 16 may be fastened to the filter screen 12 by an inner seam strip 17 extending along the seam 13. The seam 13 and the inner seam strip 17 may be fastened by a series of welds or other means known in the art. A concentric collar or band 18 may also be disposed about the inner circumference of each end of the concentric filter screens 12 and 16 to fasten the filter screen 16 to the filter screen 12 and to increase the rigidity of the filter 10. The concentric collars 18 may be fastened to the filter screens 12 and 16 by welds or other means known in the art. In the exemplary embodiment disclosed, the filter screen 16 is a 60×60 No. 304 stainless steel screen. Additional screen layers and other screen materials and perforation areas may be used in alternative embodiments.

A radial flange 20 having an inner surface and an outer surface is concentrically disposed about the outer surface of each end of the filter screen 12 and is an integral part of a radial flange collar 22. The radial flange collar 22 is disposed over each end portion of the filter screen 12 and is fastened thereto by welds. A plurality of tabs 24 may be welded or otherwise secured on the inner surface of each radial flange 20 at equal angular intervals to aid in the installation of the filter 10 as further discussed below. The filter 10 also includes a removal rod 28 disposed across at least one end of the filter 10. The rod 28 may be welded to one of the collars 18. The inner seam strip 17, collar 18, radial flange 20, radial flange collar 22, tabs 24, and removal rod 28 may also be manufactured from a No. 304 stainless steel material. A ring gasket 26 is fastened to an outer surface of each radial flange 20 by a heat exchange fluid resistant adhesive or by other means known in the art. The gasket 26 may be of a neoprene or similar material having a durometer hardness of approximately 60. The gasket 26 of the exemplary embodiment provides a fluid seal as discussed below.

The filter 10 may be used to filter the heat exchange fluid of the modular refrigeration system 50 comprising one or more refrigeration units 52 shown in FIG. 1. Each refrigeration unit 52 generally comprises a frame 54 and one or more compressors 56 for compressing a working fluid that circulates through a closed system having condensor coils and evaporator coils known in the art but not shown in the drawing. The exemplary refrigeration unit 52 includes a condensor compartment 58 and a separate evaporator compartment 60 in which the condensor coils and the evaporator coils are respectively disposed. A condensor heat exchange fluid supply conduit 62 supplies the heat exchange fluid to the condensor compartment 58 through condensor compartment inlet pipes 64.

The heat exchange fluid is circulated over the condensor coils and is removed from the condensor compartment through condensor compartment outlet pipes 66 to a condensor heat exchange fluid return conduit 68. A heat exchange fluid is also circulated through the evaporator compartment 60 through an evaporator heat exchange fluid supply conduit 70, evaporator compartment inlet pipes 72, evaporator outlet pipes 74, and evaporator heat exchange fluid return conduit 76 in the same manner as discussed above with respect to the condensor compartment 58.

The refrigeration units 52 may be arranged to form a modular refrigeration system by interconnecting the condensor supply and return conduits 62 and 68 of adjacent refrigeration units 52 with couplings 78. The arrangement forms a series of condensor supply and return conduits common to each refrigeration unit 52. One end of the condensor supply conduit 62 is connected to a heat exchange fluid source not shown and the other end of the condensor supply conduit 62 is sealed with an end cap 80 secured to the conduit by a coupling 78. The exemplary coupling 78 and end cap 80 disclosed are VICTAULIC ® brand components.

One end of the condensor return conduit 68 is connected to a heat exchange fluid sink not shown and the other end of the condensor return conduit 68 is also sealed with an end cap 80 secured to the conduit by a coupling 78. In this manner, the heat exchange fluid is supplied to each refrigeration unit 52 comprising the refrigeration system 50 through the interconnected condensor supply conduits 62, circulated through the condensor compartment 58 of each refrigeration unit in parallel and returned to the heat exchange fluid sink through the interconnected condensor return conduits 68. The evaporator supply conduit 70 and the evaporator return conduit 76 of adjacent refrigeration units 52 are also interconnected and operate in the same manner as discussed above with respect to the condensor conduits 62 and 68.

In operation, a filter 10 is disposed in both the condensor heat exchange fluid supply conduit 62 and the evaporation heat exchange fluid supply conduit 70 of each refrigeration unit 52. It will be appreciated that the filter 10 may be disposed in a conduit used for purposes other than supplying a heat exchange fluid to a refrigeration unit.

The outside diameter of the radial flange 20 of the filter 10 is slightly smaller than the inside diameter of the supply conduits 62 and 70, to prevent binding between the filter 10 and the conduits 62 and 70. The gasket 26, however, has substantially the same outside diameter as the inside diameter of the supply conduits 62 and 70, and fixedly positions and supports the filter 10 in the conduits 62 and 70. The filter 10 is substantially the same length as the supply conduits 62 and 70 of each refrigeration unit 52.

By extending the filter 10 along the entire length of the supply conduits, the area over which the fluid is filtered is maximized, which minimizes the drop in fluid pressure in the conduit. In a refrigeration system 50 comprised of a single refrigeration unit 52, the filter 10 may be readily installed in and removed from the supply conduits 62 and 70, upon removing the end caps 80. Upon installing the filter 10 in a refrigeration unit 52, one of the gaskets 26 of the filter 10 will form a seal with a heat exchange fluid source header pipe not shown. The other gasket 26 of the filter 10 will form a seal with the end cap 80.

The heat exchange fluid is supplied from the heat exchange fluid source to the inner volume of the filter 10 and is filtered through the filter screens 12 and 16 as it flows radially outward to the volume between the filter 10 and the supply conduits 62 and 70. The heat exchange fluid then circulates through the compartments 58 and 60, respectively, as discussed above. The gaskets 26 between the filter 10 and the end cap 80 and the fluid source header pipe discussed above prevent particulate matter from circumventing the filter screens 12 and 16 and circulating into the compartments 58 and 60 where they may accumulate and decrease system efficiency.

In a refrigeration system 50 comprised of more than one refrigeration unit 52, the filters 10 may be installed in and removed from the supply conduits 62 and 70 by removing the end caps 80.

In this instance, a filter is installed in the condensor conduit 62 and evaporator conduit 70 of each unit 52. The gaskets 26 of adjacent filters 10 abut one another to form a seal which prevents particulate matter from circumventing the filter 10. The filtering process proceeds as discussed above. The seal between gaskets 26 of adjacent filters 10 is enhanced by the force of the heat exchange fluid which applies pressure to the filters 10 in the direction of the heat exchange fluid flow. By extending one or more filters 10 along the entire length of the conduit as discussed above, the surface area of the filter screens is maximized thereby reducing the pressure drop along the conduit.

The filters 10 may be removed from the supply conduits 62 and 70 by engaging the removal rod 28 with a hook (not shown) extended down the supply conduits 62 and 70. The tabs 24 on the filter 10 assist guiding the filter 10 into and out of the supply conduits 62 and 70 by preventing the radial flanges 20 from becoming lodged in gaps that may occur between adjacent conduits interconnected by couplings 78, and by presenting a smooth sliding surface to the inner wall of the conduit.

It will be understood that modifications and variations may be made to the foregoing embodiments and that equivalent embodiments exist all of which are within the scope of the appended claims.

What is claimed is:

1. A unitary filter disposable in a heat exchange conduit of a refrigeration unit, wherein the heat exchange conduit is connectable to an adjacent conduit of an adjacent refrigeration unit, the filter comprising:
   a first substantially cylindrical filter screen having a first end and a second end,
   an annular flange radially disposed on the first end and the second end of the first substantially cylindrical filter screen, each annular flange having an inner surface and an outer surface; and
   an annular gasket concentrically disposed on the outer surface of each annular flange, each annular gasket having a diameter greater than the diameter of each annular flange, said filter being adapted to be connected in series with a second filter having the same flange and gasket structure when both filters are disposed in the heat exchange conduits of adjacent refrigeration units, and to form a seal between the annular gaskets in said filters.

2. The filter of claim 1 further comprising a second cylindrical filter screen concentrically disposed within the first substantially cylindrical filter screen.

3. The filter of claim 2 further comprising a tab disposed on the inner surface of each annular flange and extending substantially parallel with an axis of the first substantially cylindrical filter screen.

4. The filter of claim 2 wherein the filter is comprised of stainless steel.

5. The filter of claim 2 wherein the first screen has a 50% open area.

6. The filter of claim 2 wherein the second filter screen is a wire mesh.

7. The filter of claim 2 further comprising a removal rod disposed within said filter.

8. A filter disposable in a heat exchange conduit of a refrigeration unit, wherein the heat exchange conduit is connectable to an adjacent heat exchange conduit of an adjacent refrigeration unit, the filter comprising:
- a first substantially cylindrical filter screen having a first end and a second end;
- a second substantially cylindrical filter screen comprised of a wire mesh concentrically disposed within the first substantially cylindrical filter screen;
- an annular flange radially disposed on the first end and the second end of the first substantially cylindrical filter screen, each annular flange having an inner surface and an outer surface,
- a removal rod fixedly disposed across an end of the filter;
- a tab disposed on the inner surface of the annular flange and extending substantially parallel with an axis of the first substantially cylindrical filter screen; and
- an annular gasket concentrically disposed on the outer surface of each annular flange, each annular gasket having a diameter greater than the diameter of each annular flange, said filter being adapted to be connected in series with a second filter having the same flange and gasket structure when both filters are disposed in the heat exchange conduits of adjacent refrigeration units, and to form a seal between the annular gaskets in said filters.

9. A filter cartridge comprising:
- a first substantially cylindrical filter screen having a first end and a second end;
- a second substantially cylindrical filter screen comprised of a wire mesh concentrically disposed within the first substantially cylindrical filter screen;
- an annular flange radially disposed on the first end and the second end of the first substantially cylindrical filter screen, each annular flange having an inner surface and an outer surface;
- a removal rod fixedly disposed across an end of the filter;
- a tab disposed on the inner surface of the annular flange and extending substantially parallel with an axis of the first substantially cylindrical filter screen; and
- an annular gasket concentrically disposed on the outer surface of each annular flange, each annular gasket having a diameter greater than a diameter of each annular flange.

* * * * *